US 6,600,755 B1

(12) United States Patent
Overs et al.

(10) Patent No.: US 6,600,755 B1
(45) Date of Patent: Jul. 29, 2003

(54) LINK TECHNOLOGY DETECTION IN MULTIPLE SPEED PHYSICAL LINKS

(75) Inventors: Patrick M Overs, Caddington (GB); Ronald R Aszkenasy, Chesham (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/365,828

(22) Filed: Aug. 3, 1999

(30) Foreign Application Priority Data

Jun. 22, 1999 (GB) .............................................. 9914409

(51) Int. Cl.⁷ .............................. H04J 3/16; H04J 3/22
(52) U.S. Cl. ........................................ 370/465; 370/464
(58) Field of Search .................................. 370/465, 286, 370/213, 248, 433; 375/225, 222

(56) References Cited

U.S. PATENT DOCUMENTS

| 4,780,883 A | * 10/1988 | O'Connor et al. ........... 375/219 |
| 5,432,775 A | * 7/1995 | Crayford ..................... 370/248 |
| 5,610,903 A | * 3/1997 | Crayford ..................... 370/213 |
| 5,754,552 A | 5/1998 | Allmond et al. |
| 5,907,553 A | * 5/1999 | Kelly et al. ................. 370/433 |
| 6,097,754 A | * 8/2000 | Fitch et al. .................. 375/222 |
| 6,141,352 A | * 10/2000 | Gandy ......................... 370/463 |
| 6,377,640 B2 | * 4/2002 | Trans ........................... 370/286 |
| 6,457,055 B1 | * 9/2002 | Hwong et al. ............... 709/227 |
| 6,504,849 B1 | * 1/2003 | Wang et al. ................. 370/455 |

FOREIGN PATENT DOCUMENTS

EP             0863640 A2        9/1998

OTHER PUBLICATIONS

IEEE Std 802.3, 1998 Edition, Local and Metropolitan Area Networks, 1998, 3 pages (pp. 698–691).

* cited by examiner

Primary Examiner—Wellington Chin
Assistant Examiner—Jamal Fox
(74) Attorney, Agent, or Firm—Nixon & Vanderhye P.C.

(57) ABSTRACT

The invention concerns an improvement to an auto-negotiation process for a link between network devices and in particular the avoidance of ambiguity when signals at a higher rate, such as 100BASE-Tx scrambled idle signals, resemble signals at a lower rate, such as 10BASE-T link pulses. Analog and digital filtration is employed to identify 100BASE-Tx energy more accurately and a resultant indicating signal is used in conjunction with another signal characteristic of the higher rate signals, such as a descrambler lock signal, to ensure that the link is not established unless the bit error rate is reasonably low.

10 Claims, 3 Drawing Sheets

LINK TECHNOLOGY DETECTION IN MULTIPLE SPEED PHYSICAL LINKS

FIELD OF THE INVENTION

This invention relates to packet-based data communication systems, particularly 'Ethernet' systems wherein data may be conveyed over a link between physical layer devices at a rate which is selected from a plurality of rates (usually two rates) by the process known as auto-negotiation. More particularly, the invention concerns, in addition to the process of auto-negotiation, the additional testing of signals conveyed over the link in order to discriminate against false or misleading signals which may lead to erroneous auto-negotiation.

BACKGROUND TO THE INVENTION

Auto-negotiation is the conventional term used to describe the means to exchange information between two devices that share a link segment and to configure both devices automatically to take maximum advantage of their abilities (including the rate at which they can handle data). In the specific example described hereinafter, auto-negotiation is explained with reference to physical layer link signalling for 10 Megabits per second and 100 Megabits per second and the selection between these rates, particularly in relation to 10 BASE-T signalling and 100 BASE-Tx signalling in accordance with the IEEE Standard 802.3, 1998 Edition. However, the invention may have a broader application where signals at the higher of two data rates may resemble coded signals employed for auto-negotiation and transmitted at the lower rate.

The auto-negotiation function is provided at the physical layer of the OSI reference model. The function allows devices at both ends of a link segment to advertise their operation abilities, acknowledge receipt and understanding of the common mode or modes of operation that both devices share, and to reject the use of operational modes that are not shared by both devices. Where more than one common mode exists between the two devices, a mechanism is provided to allow the devices to resolve to a single mode of operation using a predetermined resolution function. As is described in IEEE Standard 802.3, 1998 Edition, published by the Institute of Electrical and Electronic Engineers Inc. NY10017-2394, USA, and more particularly in Clause 28 of that Standard, auto-negotiation is controlled by an auto-negotiation state machine which, broadly speaking, responds to link pulses indicating advertised abilities and selects a mode of operation, including a selection from at least two nominal data rates, and controls a physical medium attachment layer accordingly. The physical medium attachment layer is interposed between signal paths extending from a port of a network device and is itself connected to a physical coding sub-layer. The physical medium attachment layer contains the functions for transmission, reception and (if appropriate) collision detection, clock recovery and skew alignment and is connected, by way of a physical coding sub-layer, to a medium independent interface which conveys signals between the physical layer device (PHY) and the higher layers of the network device. In particular the medium independent interface (MII) is connected by way of a reconciliation sub-layer to the medium access control layer (sometimes called layer 2) and then to the logical link control layer (sometimes called network layer or layer 3). All these terms are herein used in the senses used in the aforementioned Standard.

Auto-negotiation in the manner prescribed by Clause 28 of the aforementioned Standard depends on the transmission of a group of link pulses, which are a modified form of link pulses employed by 10BASE-T units, as a mechanism to determine if the link segment is operational in the absence of packet data. Whereas the ordinary link integrity test pulses (usually called normal link pulse sequence) comprises pulses in a prescribed form transmitted every sixteen milliseconds while a data transmitter is idle, auto-negotiation employs a fast link pulse burst, which encodes the data used to control the auto-negotiation function. These bursts are transmitted only during a process of auto-negotiation and not otherwise. A fast link pulse burst consists of an initial clock pulse and thereafter a sequence of alternating data pulses and clock pulses. The spacing of the alternate clock pulses is prescribed to be between 111 microseconds and 139 microseconds (typically 125 microseconds) whereas the spacing from a clock pulse to the following data pulse is prescribed to be between 55.5 microseconds and 69.5 microseconds, typically 62.5 microseconds. There is prescribed an interval of between 8 and 24 milliseconds from fast link pulse (FLP) burst to the next. The significance of the fast link pulse burst, and in particular the manner in which the data advertising the modes of operation is conveyed is fully set out in the aforementioned clause, particularly from sub clause 28.2.1.2 onwards.

It is normal for a physical layer device (PHY) when in an idle state to transmit a sequence of 'idle' pulses. A device which operates in a 100BASE-Tx mode normally employs a three level coding with scrambling, wherein the signal level at any interval is determined by a combination of consecutive data symbols. When a device operating in 100BASE-Tx is outputting scrambled idle symbols with long runs of no transitions, the result may, under certain conditions, resemble 10BASE-T link pulses and as will be explained, the PHY can 'parallel detect' a 10BASE-T link in error. The phenomenon generally occurs at 'mid-range' cable lengths, typically cable lengths of 60 to 70 meters and can be dependent on temperature.

More particularly, when the PHY is auto-negotiating, four processes occur. One is the transmission of fast link pulses advertising the capabilities of the PHY. There are three receiving processes active in the RX port. One is (by way of a 10BASE-T receiver) the search for fast link pulses (FLPs) from the link partner. A second, by means of a 100BASE-Tx receiver, is a search for 100BASE-Tx idle signals, which are MLT3 (three-level) signals scrambled using a polynominal generated by an 11-bit PN generator. A third, using the 10BASE-T receiver, searches for 10BASE-T normal link pulses (NLPs). The receiving processes are preferably operated in cyclic sequence. Whichever process 'wins', i.e. achieves detection first, determines the subsequent operation of the PHY. Thus, if the FLP receiving process wins, a full auto-negotiation session follows. If the 100BASE-Tx receiving process wins, 100BASE-Tx link operation starts immediately. If the 10BASE-T receiving process wins, 10BASE-T link operation starts immediately.

It may happen that (i) the receiver cycling is such that the 10BT receiver happens to the first opportunity at the incoming signal, and (ii) the three level (MLT3) scrambled signal is interpreted by the 10BASE-T receiver as normal link pulses. This may happen for the following reasons.

The 100BASE-Tx IDLE signal is scrambled using a polynomial that repeats every 2048 symbol times (about 80 µs). There are several "long 1" pulses in this pattern that can resemble 10BASE-T NLP Pulses. A NLP detector rejects NLP pulses that are closer together than 4 ms. This causes it to reject auto-negotiate FLP pulses (which are 60–125 microseconds apart) and to reject scrambled MLT3 idle with its 80 μs repetition rate.

The 10BASE-T NLP detector circuit consists of two sections—a carrier detector, which is looking for a signal energy level which exceeds a squelch threshold that is about 440 mV, and a link detector which is looking for 10BASE-T link pulses. The outputs of the two circuits are ANDed together, and the result is sent to the NLP Link Detection Function.

At the specific line length, the MLT3 signal strength is exactly at a level where it "fades" in and out. The carrier detector randomly asserts and de-asserts. Simultaneously, the link detector sees each and every "long 1" in the MLT3 pattern. The two are ANDed together, and the result is a "notched" stream of link pulses. If the notching happens just right, it seem as though there are four link pulses each spaced >4 ms to the NLP link detector. If this happens, the 10BASE-T receiver will be the winner, and the device will proceed in a full 10BASE-T mode.

Once a 10BASE-T link is established, the criteria for maintaining the link becomes easier. The criteria becomes the presence of NLP pulses or simply 10BASE-T receive activity. It is relatively easy for MLT3 signals to resemble 10BASE-T receive activity to the 10BASE-T receiver (this happens at just about any line length). So once the condition occurs, it stays locked there.

At present, the process of auto-negotiation does not explicitly include any means of determining the quality of the link between devices that are capable of auto-negotiation and accordingly it is the object of the present invention to improve known processes of auto-negotiation to avoid erroneous auto-negotiation in the aforementioned circumstances or other circumstances in which, for example, idle pulses at a higher data rate can resemble coded bursts at a lower data rate and thereby produce ambiguities or frustration in an auto-negotiation sequence.

SUMMARY OF THE INVENTION

The invention is based on the use of a filtering to identify accurately energy at the higher of the two relevant rates. This is preferably employed to qualify a final approval of the connection of the link of the higher rate with a descrambler lock indication to ensure that the link does not establish until an error rate is reasonably low. Preferably, as described later, priority may be added in the form of additional states in an auto-negotiation state machine.

The following drawings illustrate one example of the invention.

DESCRIPTION OF A PREFERRED EXAMPLE

Figure 1:
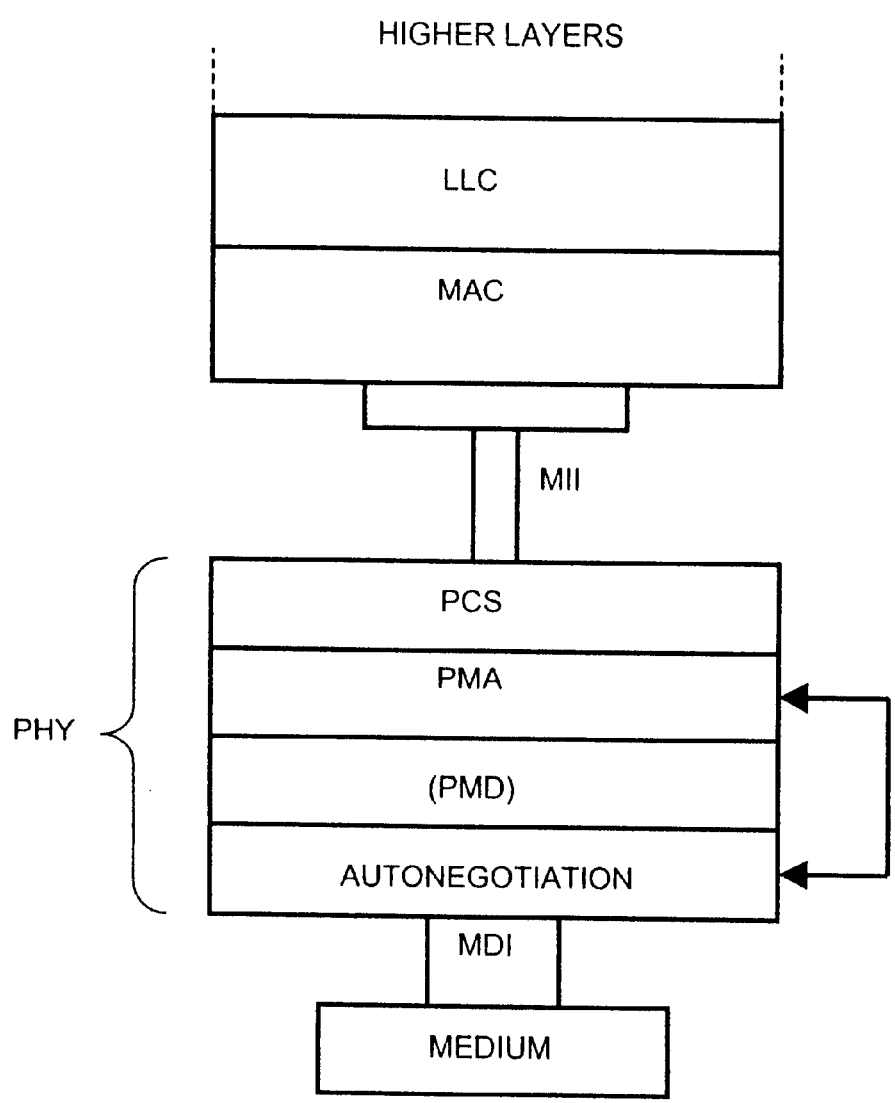
FIG. 1 is an explanatory diagram illustrating various layers in a network device.

FIG. 1 of the drawings is intended to provide a general overview of a physical layer device (PHY) and its relation to other layers of a network device for use in a data communication system such as an Ethernet system. The Figure illustrates a physical layer device (PHY) which is connected to higher layers of the network device by a medium independent interface (MII) which leads to the medium access control layer and to the logic link layer control or network layer. The physical layer device or entity (PHY) describes that portion of the physical layer between the medium dependent interface (MDI) and the medium independent interface (MII). These are the terms employed within IEEE Standard 802.3. In other circumstances, the PHY is between the medium independent interface and the gigabit medium independent interface (GMII) for gigabit systems and so on. The PHY contains the functions that transmit, receive and manage the encoded signals that are impressed on and recovered from the physical medium. The physical medium attachment (PMA) sub-layer, within the particular Standard indicated, is that portion of the physical layer that contains the functions for transmission and reception and (depending on circumstances) collision detection, clock recovery and skew alignment. If required, the physical medium dependent sub-layer (PMD) is that portion of the physical layer responsible for interfacing to the transmission medium.

The standard OSI model shown in FIG. 1 includes a PCS (Physical Coding Sub-layer between the MII (Media Independent Interface) and the PMA (Physical Medium Attachment) layer.

The auto-negotiation sub-layer (auto-negotiation) is provided at the physical layer. Devices that support multiple modes of operation advertise the fact using this function. The actual transfer of information of ability is observable only at the medium dependent interface or on the medium. Auto-negotiation signalling does not occur across the medium independent interface. The organization of auto-negotiation is well established and will not be described herein. Reference should be made to aforementioned Standard, and particularly Clause 28, for the specific modes mentioned herein. The Standard also describes auto-negotiation in other circumstances.

The significance of FIG. 1 from the present point of view is that the auto-negotiation sub-layer, which is further described with reference to FIG. 2, receives signals from and directs signals to the PMA sub-layer in order to control that sub-layer in accordance with the particular operational mode or modes which the auto-negotiation state machine has selected. The operation of a normal auto-negotiation state machine in the particular Standard is shown in Table 28-16 of the aforementioned publication.

Figure 2:
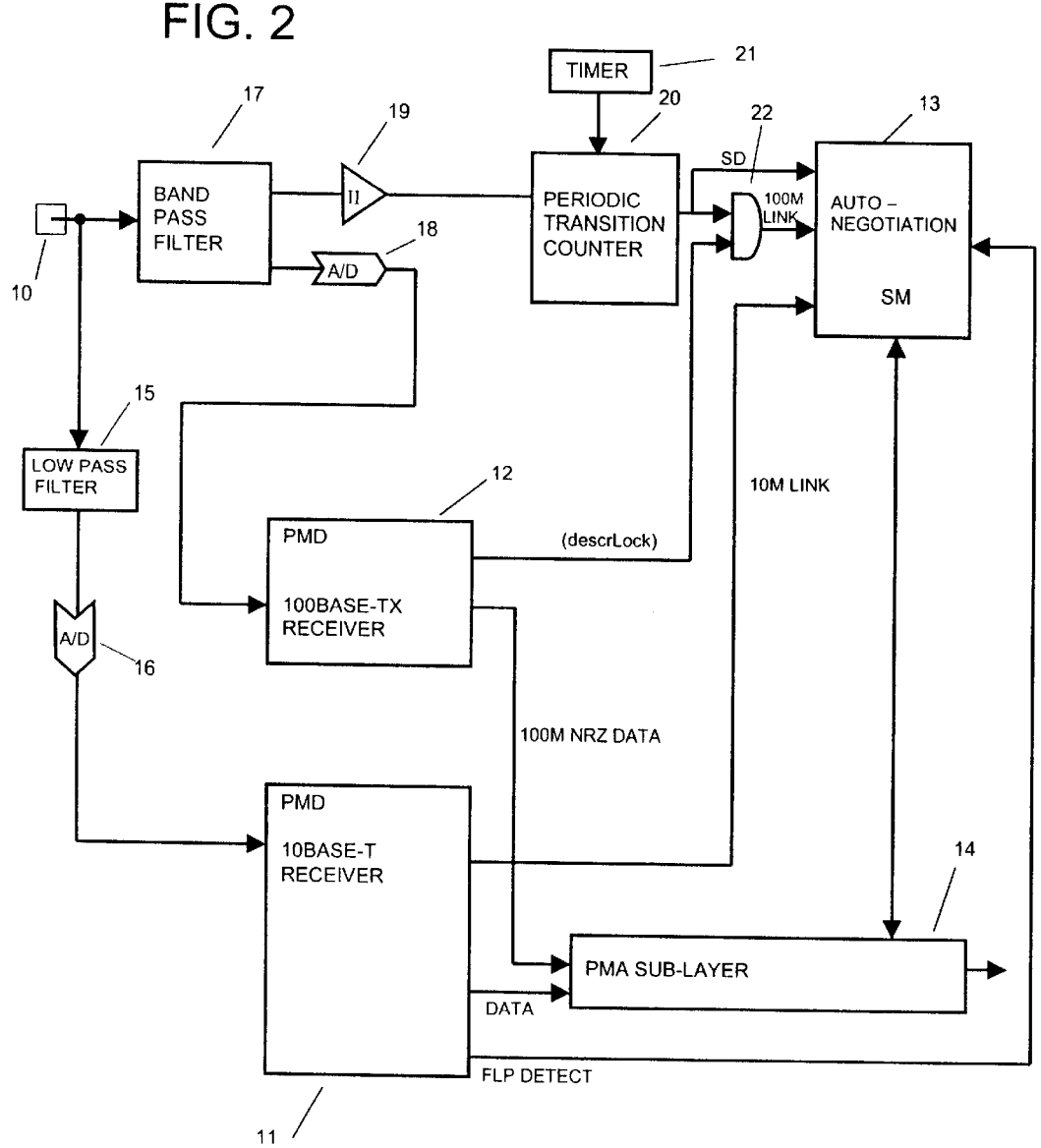
FIG. 2 is a schematic diagram illustrating one embodiment of the invention.

Reference will now be made to FIG. 2, which illustrates one embodiment of the invention. This embodiment assumes that the auto-negotiation sub-layer of the physical layer entity (PHY) will auto-negotiate between the device in which it is incorporated and a device connected to it and, among other modal characteristics not relevant to the present invention, will arbitrate to determine whether the links shall be operated according to 10BASE-T (transmission at 10 Megabits per seconds over a twisted pair) or 100BASE-Tx (transmission at 100Megabits per second over a twisted pair). It should be kept in mind that the device to which the PHY is linked may be a 100BASE-Tx device or a 10BASE-T device which is not capable of auto-negotiation.

Part of FIG. 2 resembles known devices and that which is common to the prior art will be described first. A port 10, which is physically connected to cable connecting the device to the other device at the far end of the link, includes a 10BASE-T receiver 11, which is part of the physical media independent (PMD) sub-layer, and a 100BASE-Tx receiver 12 (also part of the PMD sub-layer).

The receiver 11 can detect normal link pulses and provide a corresponding signal denoted '10M LINK' to an auto-negotiation state machine 13. It can also detect fast link pulses and provide a corresponding signal denoted 'FLP DETECT' to the state machine 13. It can also provide 10BASE-T data (i.e. packet data) to a PMA sub-layer 14, which will convey the data to higher layers (not shown) for processing in any desired manner not relevant to this invention.

The receiver 12 includes means (such as a PN correlator) for detecting the scrambled sequence of 100BASE-Tx idle signals and, preferably for bit error rates not greater than 1 in $10^2$, produces a 'descrambler lock' signal. Such an error rate is much higher than is acceptable for packet data but may be regarded as sufficiently 'low' for the purposes of the present invention. In known devices such a signal (descrLock) is provided directly to the auto-negotiation state machine 13. The receiver 12 also provides 100 Mb/s NRZ data (i.e. packet data) to the PMA sub-layer 14.

The auto-negotiation state machine 13 in accordance with well known practice and as described in the aforementioned Standard, examines the advertised abilities of the remote device (if the remote device is capable of such advertisement) as coded in the fast link pulses, and also the advertised abilities of the physical layer device in which it is incorporated. It will arbitrate in order to determine for the link between the two devices a particular mode of operation including the highest rate of data transmission of which both devices are capable. The state machine 13 controls the physical medium access sub-layer 14 accordingly.

As shown in FIG. 2, the device includes a low-pass filter 15 and an analog-to-digital converter 16, to recover the three-level MLT-3 signals for the 10BASE-T receiver. It is also normal for the 100BASE-Tx receiver to be coupled to port 10 by way of a filter (though not the same as filter 17) and an analog-to-digital converter 18.

The present invention distinguishes between scrambled idle signals at a rate corresponding to a higher data rate and signals, specifically link pulses, at the lower data rate by a digital filter, preferably in the form of a periodic transition counter, which develops a signal for qualifying the descr-Lock signal characteristic of the higher rate signal and denoting a 'low' error rate in it. The filter is preferably preceded by a specific analog filter, as explained in the following.

More particularly, the input port 10 is coupled to the input of the filter 17 which is intended to pass a band broadly centered on the fundamental frequency of the higher data rate and to have a rejection band which includes at least the fundamental frequency of the lower data rate. The filter may be implemented as an RC filter with poles at 20 megahertz and 160 megahertz for the specific circumstances described herein. It could be a high pass filter, rejecting a band including the lower rate but is preferably a band pass filter rejecting also high frequency noise.

The filter 17 is thus interposed between the link and the customary analog to digital converter 18, to provide some more accurate identification of 100BASE-Tx energy.

A second output of the filter 17 is connected to a comparator 19 which compares the input signal level with a reference level so as to provide an output only if the input signal is above that reference level, which may be selected as 100 millivolts. The output of the comparator is coupled to the input of a counter 20 which is controlled by a timer 21. The counter 20 is disposed to count edges (both positive-going and negative-going) and to produce a 'signal detect' (SD) signal if it counts a selected number, such as 200, of such edges within an appropriate interval, such as 8 $\mu$s, set by the timer 21. The counter in this particular embodiment of the invention automatically resets. Moreover, it preferably includes hysteresis: specifically, it de-asserts the SD signal only when, once that signal is asserted, it counts fewer than the specified number of edges in the set interval for a plurality of times (such as three times).

The SD signal is an indication of the reliability of the link to the remote device and is provided to the state machine 13. The descrLock signal is qualified, i.e. is provided to the state machine 13 only when the SD signal is asserted. Thus these two signals are coupled to inputs of an AND gate 22 of which the output, denoted 100M LINK, is coupled to the state machine 13.

Figure 3:
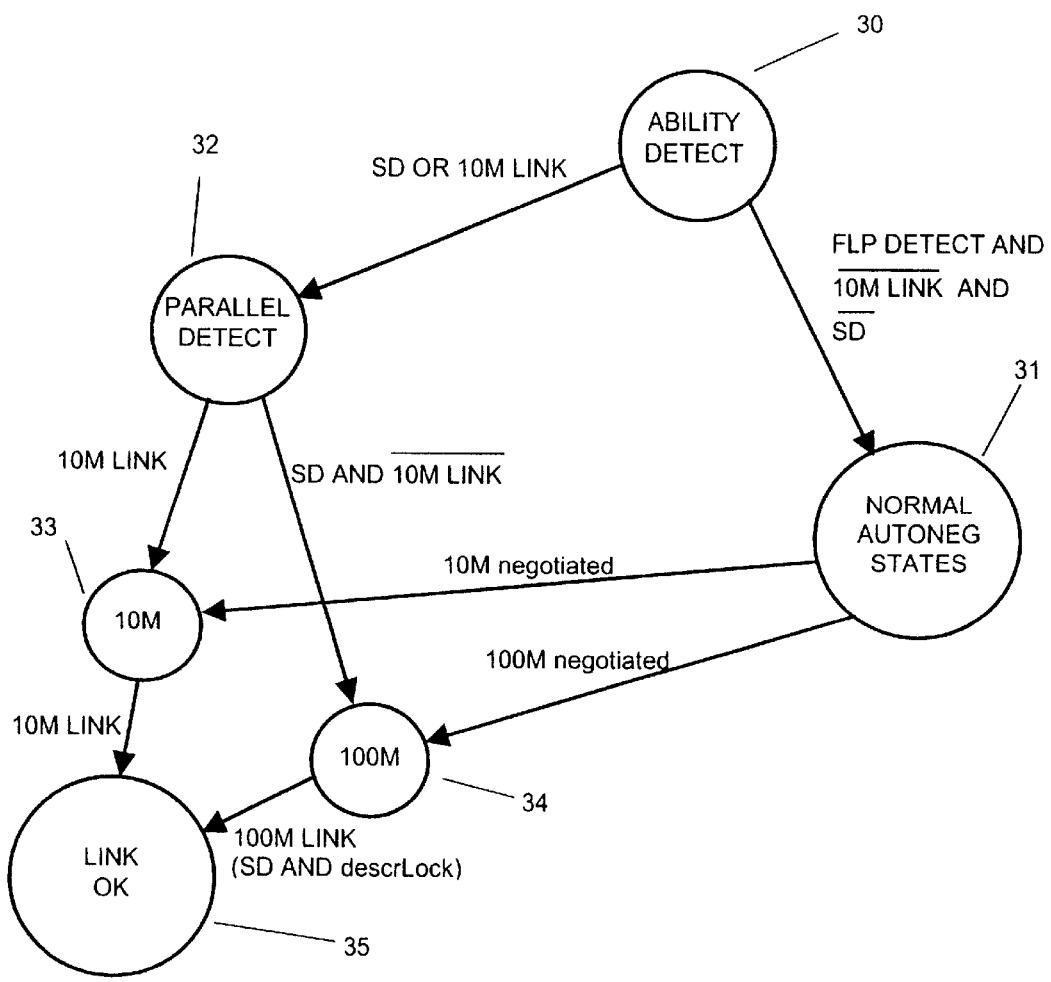
FIG. 3 is a diagram illustrating the process of link detection in conjunction with auto-negotiation in accordance with the invention.

FIG. 3 illustrates the process of the modified auto-negotiation according to the invention.

Stage 30 is the ability detect stage which corresponds to the 'ability detect' state of the auto-negotiation state machine as shown in FIG. 28-16 in the aforementioned Standard.

If a fast link pulse has been received but there is no indication of a link signal from the 10BASE-T signal path and no signal detect SD from the digital filter, the machine will transition to the normal auto-negotiation states as shown by numeral 31. The state machine will negotiate to establish (provisionally) either the 10 Megabit per second data rate, transitioning (as shown by transition denoted "10M negotiated") to state 33 or the 100 Megabit per second data rate, transitioning (as shown by transition denoted "100M negotiated") to state 34. For the transition from state 33 to the 'LINK OK' state 35, the 10M LINK signal from the receiver path 11 must be detected, whereas the transition from state 34 to the 'LINK OK' state 35 requires the presence of the 100M LINK signal, i.e. both the signal detect signal SD and the descrLock signal.

Alternatively, the state machine may transition from the ability detect state 30 into a 'parallel detect state' 32. This depends on the presence of either the signal SD or the 10M LINK pulses. From this state 32 the state machine will execute the transition to state 33 if the 10M LINK signal is detected and to state 34 if the signal SD is present but the 10M LINK signal is not. Transition to the 'LINK OK' state 35 then can occur as described above. In any event, operation of the link at the higher of the two data rates, i.e. 100M negotiated and the establishment of a satisfactory link, requires both the presence of the SD signal and the descr-Lock signal.

What is claimed is:

1. Apparatus for the auto-negotiation of operational modes of a physical layer device for use in a packet-based data communication system, including an auto-negotiation state machine which is coupled to a port and is operative to select a mode of operation, said mode including a selection from at least two data rates; wherein the apparatus includes between said port and said state machine:

(i) a first signal path arranged to produce a first indicating signal which denotes signals characteristic of the higher of the two data rates; and (ii) a second signal path including a transition counter coupled to said second signal path to count signal transitions of signals of the higher of the two data rates occurring in said second signal path, and disposed to provide a second indicating signal when the counter counts a predetermined number of transitions within a given time;

and wherein said state machine requires the presence of both the indicating signals before allowing operation at the higher of the two data rates.

2. Apparatus according to claim 1 wherein the first indicating signal is a descrambler lock signal and said first signal path includes a detector for detecting a scrambled sequence of idle signals at the higher of the two data rates to produce said descrambler lock signal.

3. Apparatus according to claim 1 wherein each of said paths includes a filter for rejecting signals at the lower of said two data rates.

4. Apparatus according to claim 3 wherein a comparator between the filter and the transition counter defines a threshold and produces signal transitions in response to crossings of the threshold by an output of the filter.

5. Apparatus according to claim 1 wherein the said first signal path includes a 100BASE-Tx receiver and the apparatus includes between the port and the state machine a 10BASE-T receiver.

6. Apparatus according to claim 5 wherein said receivers are each coupled to provide packet data at a respective data rate to a PMA sub-layer which is controlled by the state machine.

7. Apparatus for the auto-negotiation of operational modes of a physical layer device for use in a packet-based data communication system, including an auto-negotiation state machine which is coupled to a port and is operative to select a mode of operation, said mode including a selection from at least two data rates; wherein the apparatus includes:

a first receiver coupled to said port for detecting signals at a lower of said two data rates and coupled to provide an indicating signal to said auto-negotiation state machine;

a second receiver coupled to said port for detecting signals at a higher of said two data rates and coupled to provide a lock signal to said auto-negotiation state machine;

a signal path coupled to said port and said auto-negotiation state machine, said signal path including a signal transition counter disposed to assert a detection signal when the counter counts a predetermined number of signal transitions of signals at the higher of said two data rates in said signal path within a given time; and wherein said lock signal is provided to said auto-negotiation state machine only when said detection signal is asserted.

8. Apparatus as claim 7 wherein said second receiver includes a detector for detecting a scrambled sequence of idle signals at said higher frequency.

9. Apparatus as in claim 7 wherein said signal path includes a filter for rejecting signals at the lower of said two data rates.

10. Apparatus as in claim 9 and including a comparator between the filter and said signal transition counter, said comparator defining a threshold and producing signal transitions in response to crossings of the threshold by an output of the filter.

* * * * *